(12) United States Patent
Boeck

(10) Patent No.: US 6,722,119 B2
(45) Date of Patent: Apr. 20, 2004

(54) TURBOJET POWER PLANT WITH HEAT EXCHANGER

(75) Inventor: Alexander Boeck, Kottgeisering (DE)

(73) Assignee: Rolls-Royce Deutschland Ltd & Co KG, Dahlewitz (DE)

(*) Notice: Subject to any disclaimer, the term of this patent is extended or adjusted under 35 U.S.C. 154(b) by 0 days.

(21) Appl. No.: 09/878,913

(22) Filed: Jun. 13, 2001

(65) Prior Publication Data
US 2002/0020168 A1 Feb. 21, 2002

(30) Foreign Application Priority Data
Jun. 13, 2000 (DE) .......................... 100 29 060

(51) Int. Cl.[7] .............................................. F02C 7/00
(52) U.S. Cl. .................................. 60/39.17; 60/39.511
(58) Field of Search ........................ 60/39.17, 39.511

(56) References Cited

U.S. PATENT DOCUMENTS

| 2,974,495 A | 3/1961 | Pinnes et al. | |
| 3,621,654 A | 11/1971 | Hull | |
| 6,263,661 B1 * | 7/2001 | van der Burgt et al. | .. 60/39.511 |

FOREIGN PATENT DOCUMENTS

| CH | 274060 | 6/1951 | |
| DE | 854605 | 11/1952 | |
| DE | 4102833 | 8/1992 | |
| FR | 943198 | 3/1949 | |
| FR | 1242634 | 9/1960 | |
| FR | 2552163 | * 3/1985 | .............. 60/39.511 |
| GB | 529786 | 11/1940 | |
| GB | 576094 | 3/1946 | |
| GB | 827542 | 2/1960 | |
| JP | 61286535 | 12/1986 | |

* cited by examiner

Primary Examiner—Louis J. Casaregola
(74) Attorney, Agent, or Firm—Davidson Berquist Klima & Jackson, LLP

(57) ABSTRACT

Turbojet powerplant with at least one compressor (1), at least one combustion chamber (2), a high-pressure turbine (3) and a low-pressure turbine (4), characterised in that a heat exchanger (5) is arranged between the compressor (1) and the combustion chamber (2), in that at least one hot-gas line (6) branches off from an area downstream of the high-pressure turbine (3) and is connected to the heat exchanger (5), and in that at least one cold-gas line (7) connects the heat exchanger (5) with an area upstream of the low-pressure turbine (4).

16 Claims, 5 Drawing Sheets

TURBOJET POWER PLANT WITH HEAT EXCHANGER

Figure 1:
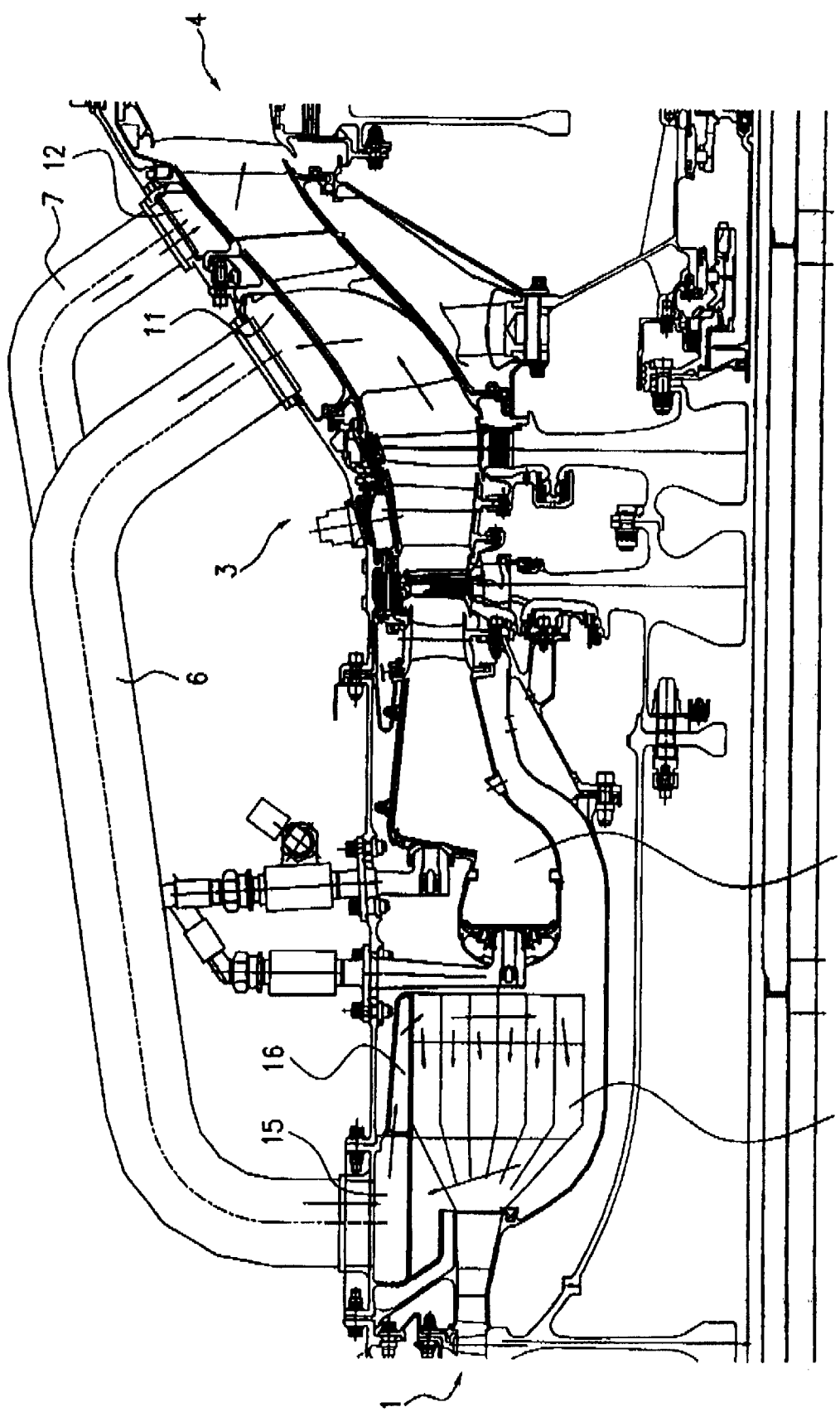

This invention relates to a turbojet powerplant for aircraft applications which is provided with a heat exchanger.

More particularly, this invention relates to a turbojet powerplant with at least one compressor, at least one combustion chamber, a high-pressure turbine and a low-pressure turbine.

A great variety of designs of turbojet powerplants is known in the prior art. The objective of the technical development in this field is the improvement of efficiency to achieve, among others, a lower fuel consumption. The associated development effort focuses on the continuous improvement of the efficiency of the individual components. However, the related optimisation measures cannot be progressed ad libitum, in particular with respect to the cost-to-profit-ratio.

In a broad aspect, the present invention provides a turbojet powerplant of the type described at the beginning which combines simplicity of design and safety of operation with improved efficiency and low specific fuel consumption.

It is the principal object of the present invention to provide remedy to the above problematics, with further advantageous aspects of the present invention being cited in the subclaims.

The turbojet powerplant according to the present invention, therefore, provides an arrangement in which a heat exchanger is located between the compressor and the combustion chamber, in which at least one hot-gas line is branched off from an area downstream of the high-pressure turbine and is connected with the heat exchanger, and in which at least one cold-gas line connects the heat exchanger with an area upstream of the low-pressure turbine.

The turbojet powerplant according to the present invention has a variety of merits.

The provision of a heat exchanger according to the present invention enables the compressed gas supplied to the combustion chamber to be heated additionally. By virtue of this additional energy input, a correspondingly smaller amount of fuel-supplied energy is needed in the area of the combustion chamber. This effects a considerable reduction of the fuel consumption, with the output power of the turbojet powerplant remaining unchanged. The take-off of hot gas from an area downstream of the high-pressure turbine ensures that the temperature of the hot gas is high enough to supply a sufficient amount of heat to the heat exchanger.

The combined effect of the features according to the present invention enables the specific fuel consumption (SFC) to be reduced between 2 and 4 percent. This reduction of the specific fuel consumption is independent of any other measures for the optimisation of the turbojet powerplant.

In a particularly favourable development of the present invention, the heat exchanger is designed such that it is capable of flowing the entire amount of the air discharged from the compressor. This ensures that the entire compressed air or the entire compressed gas, respectively, will be heated correspondingly as it flows through the heat exchanger.

The heat exchanger in accordance with the present invention is preferentially of the counter-flow type. This type provides for favourable and safe operation. In a further advantageous development, the heat exchanger is designed as diffuser on the side of the compressor air, this design providing for partial compensation of the heat exchanger pressure loss through heat transfer. This effect is augmented in that the gas exiting from the compressor is forced to pass the heat exchanger, as described above.

In a particularly favourable embodiment of the present invention, the hot gas is discharged to the high-pressure turbine via holes in the leading edge areas of a first row of vanes and is supplied to the hot-gas line via associated lines. Upon entry in the vanes, the hot gas is decelerated and ducted radially outward into a first compartment (annulus). In a favourable arrangement of the present invention, the hot-gas lines which supply the hot gas to the heat exchanger are flanged to this annulus. Apparently, the present invention may be implemented with several hot-gas lines and with several cold-gas lines. Accordingly, the purpose of the first annulus is to combine the individual hot-gas flows from the vanes.

For the protection of the first annulus against too high temperatures, heat shields are provided on its interior side.

Preferentially, for the return of the gas (cold-gas) issued in the area of the heat-exchanger, a second annulus is provided to which the cold-gas line is joined. This second annulus (annular duct) serves the uniform circumferential distribution of the returned cold gas. Again, heat shields are provided to prevent the casing of the second annulus from overheating.

From the second annulus, the cold gas flow will preferentially flow into vanes of the low-pressure turbine which are open to this second annulus. Subsequently, the cold gas exits from the interior of the vanes through openings at the trailing edges. As the gas passes through the vanes, a further heat transfer takes place between the working gas and the cold gas via the walls of the vane airfoils. Said heat transfer causes the temperatures to equalise to some extent, this effect resulting in a more uniform flow profile in the low-pressure turbine. In a favourable arrangement, the exit slots or exit openings at the trailing edges are designed as nozzles.

To ensure an aerodynamically and thermally optimum gas flow through the heat exchanger, it may be advantageous to supply the hot gas from the hot-gas lines to the heat exchanger via local hot-gas chambers. Preferentially, these hot gas chambers are connected to a hot-gas annulus from which the hot gas is fed into axially and radially arranged plates. In these plates, the hot gas flows forwards in the counter-flow direction, thereby transferring heat to the compressor airflow which passes in the opposite direction. In the front portion of the heat exchanger, the cooled-down hot gas (accordingly referred to as cold gas in this application) is collected in a cold-gas annulus and passed from there to the cold-gas lines via local cold-gas chambers. The local hot-gas chambers or the local cold-gas chambers, respectively, serve the conduction of the respective gas volume into the individual hot-gas lines or cold-gas lines, respectively.

In accordance with the present invention, then, the hot gas to be supplied to the heat exchanger is taken off downstream of the high-pressure turbine and, after having passed through and being cooled down in the heat exchanger, is fed as cold gas flow to the working gas upstream of the low-pressure turbine. This provides for a very advantageous, compact design of the turbojet powerplant on the one hand and a low total mass of the arrangement on the other. The combined effect of all these features provides for a reduction of the specific fuel consumption.

Figure 2:
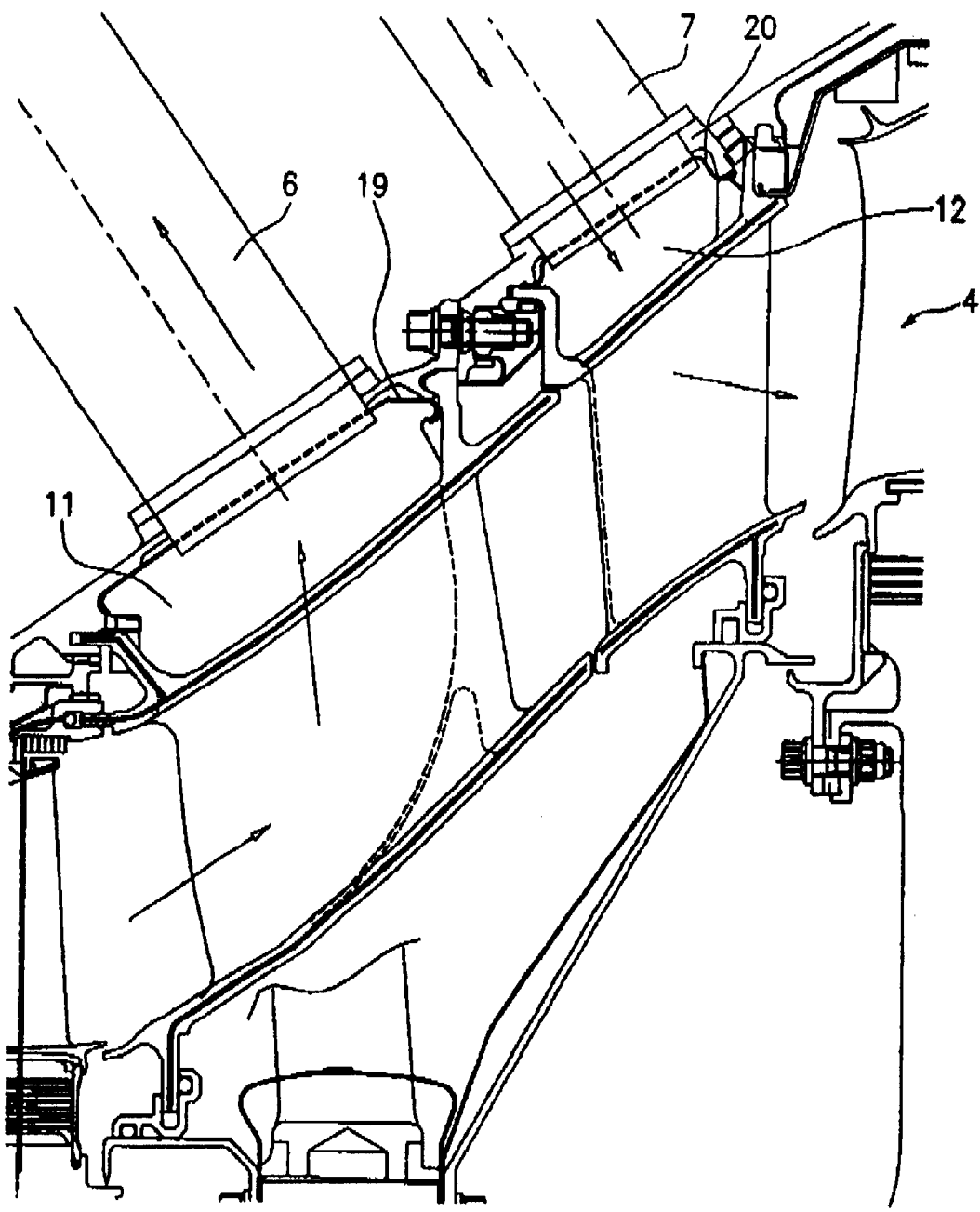
Figure 3:
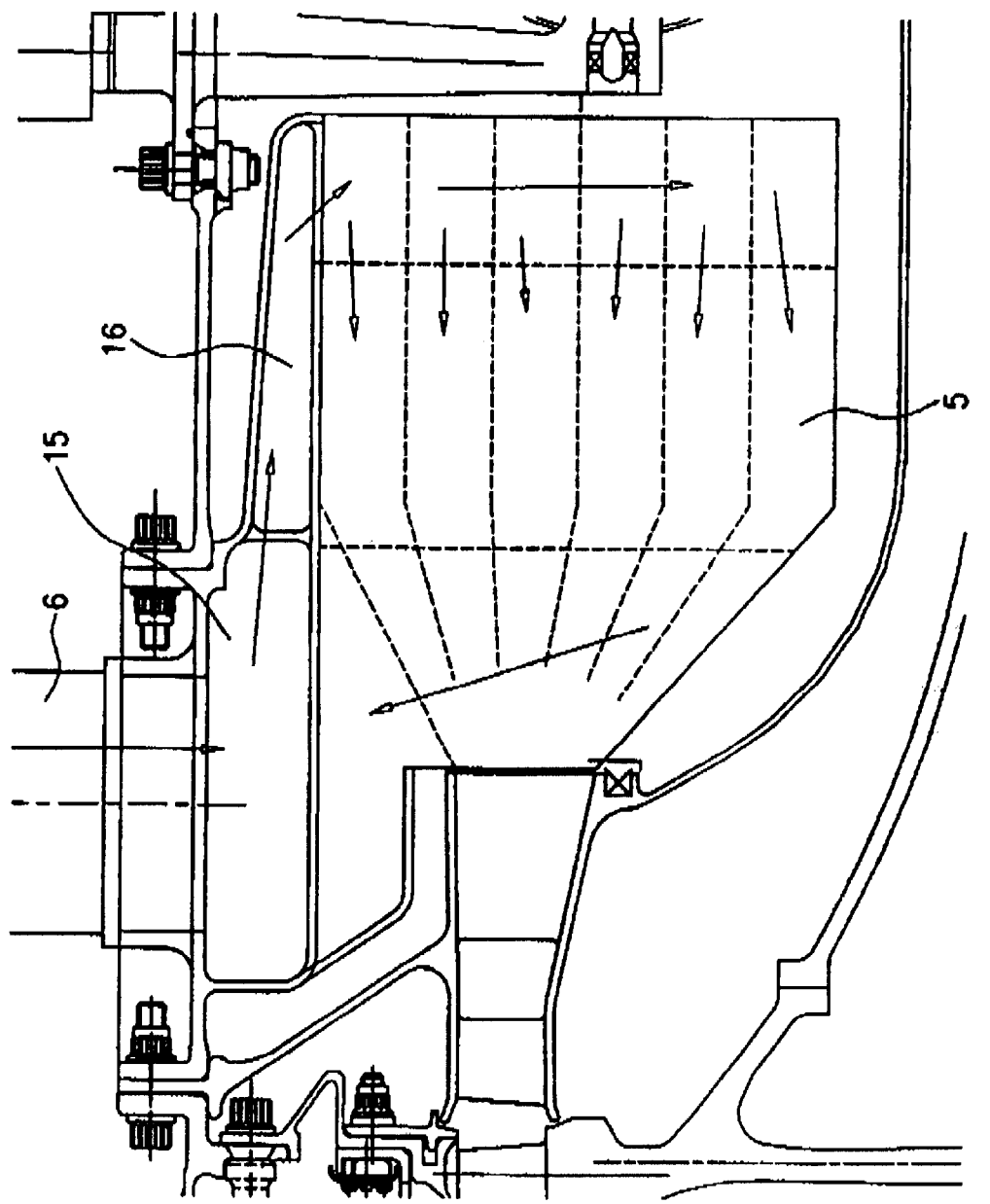
Figure 4:
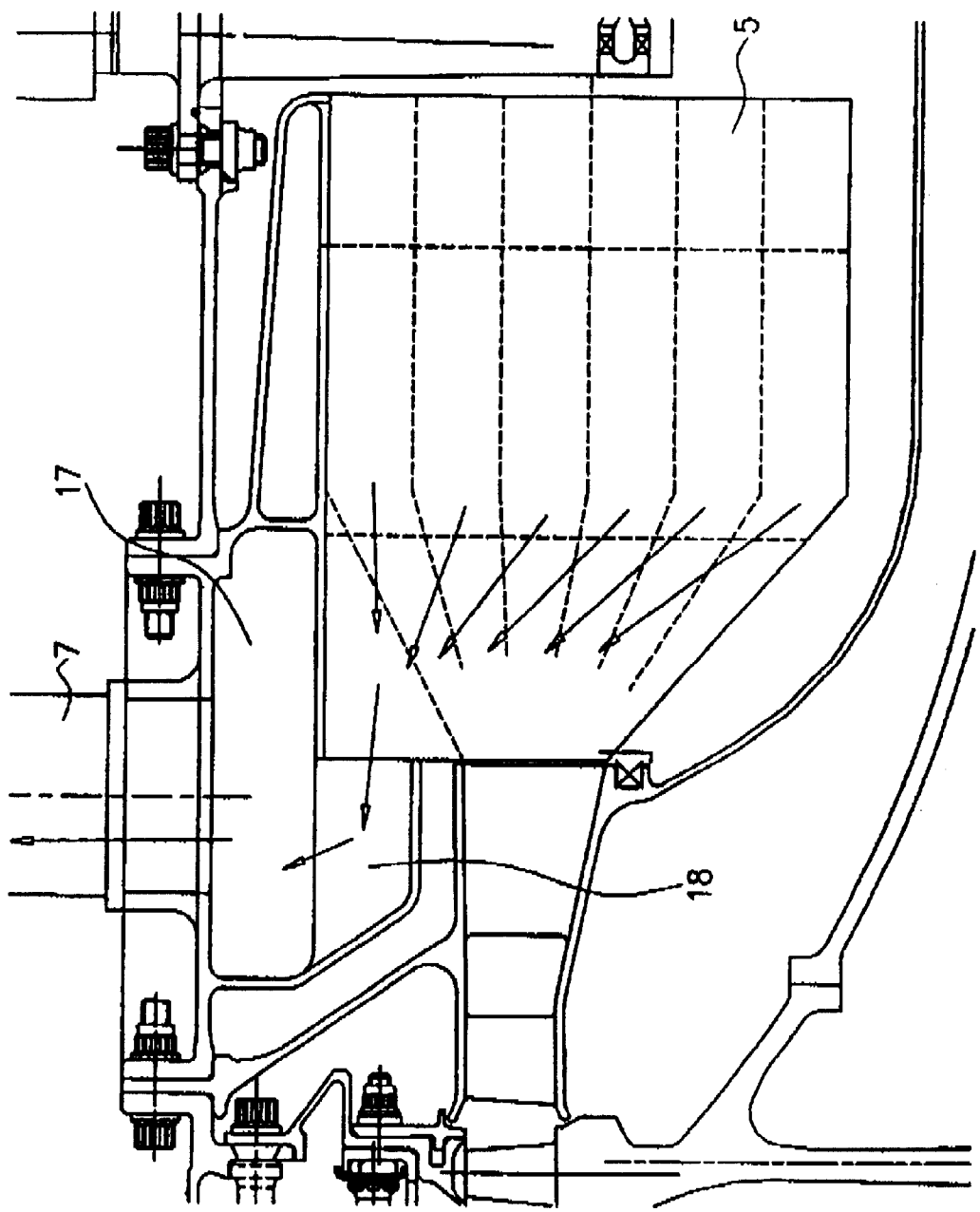
Figure 5:
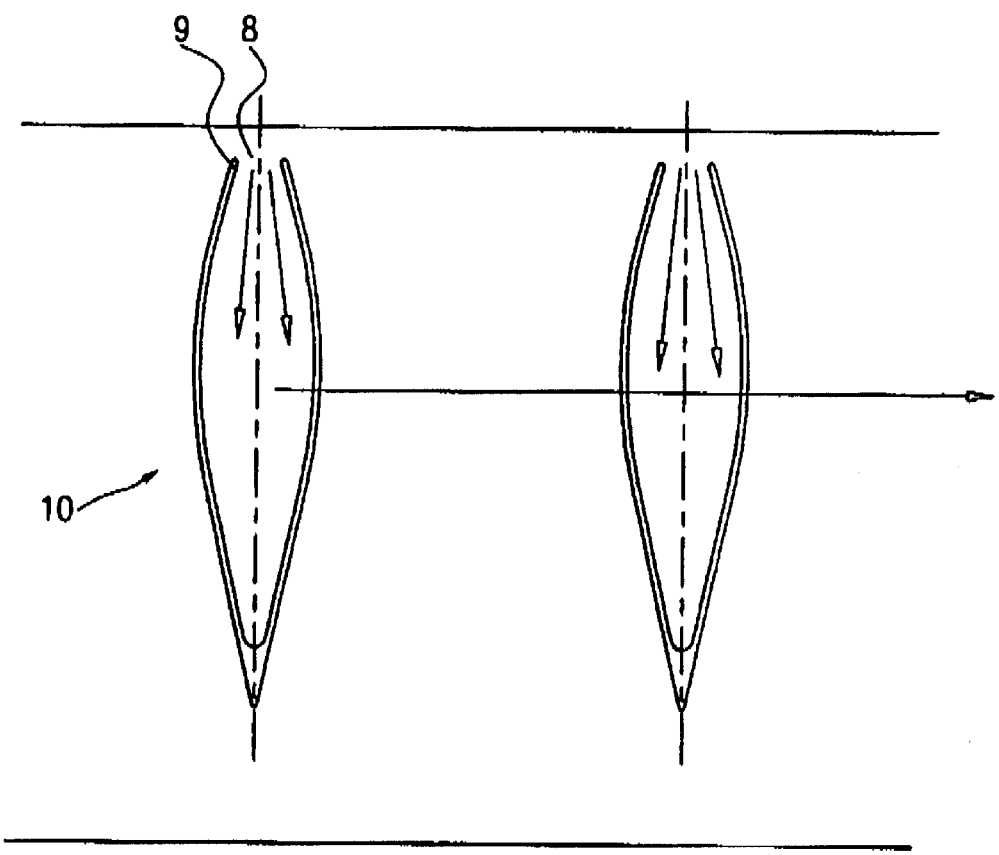
Figure 6:
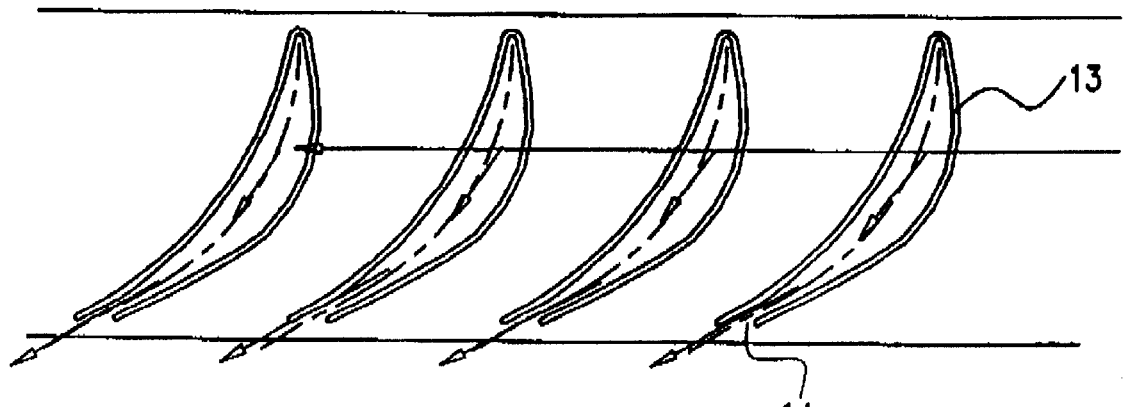

Further aspects and advantages of the present invention are described more fully in the light of an embodiment shown on the accompanying drawings, in which FIG. 1 is a schematic partial section of a turbojet powerplant according to the present invention, FIG. 2 is an enlarged detail view of the exit area of the hot gas and of the return area of the cold gas, FIG. 3 is a schematic partial section of the heat exchanger according to the present invention showing the hot-gas flow, FIG. 4 is a view similar to FIG. 3 showing the cold-gas flow, FIG. 5 is a partial section of a vane 3 for the discharge of the hot gas, and FIG. 6 is a partial section of a vane row for the return of the cold gas.

FIG. 1 shows, in a simplified partial sectional view, a partial area of the preferred embodiment of the turbojet powerplant in accordance with the present invention. In the figure, the reference numeral 1 indicates a compressor of which only a partial area is shown. The reference numeral 2 indicates a combustion chamber, the reference numeral 3 indicates a high-pressure turbine and the reference numeral 4 indicates a partial area of a low-pressure turbine. A heat exchanger 5 is illustrated between the compressor 1 and the combustion chamber 2. Apparently, according to the present invention, the arrangement and design of the heat exchanger may be varied with the design of the combustion chamber or the several combustion chambers. Accordingly, several individual heat exchangers may be provided in connection with individual combustion chambers or an annular heat exchanger may be applied in connection with an annular combustion chamber.

FIG. 1 further illustrates a hot-gas line 6 which, as indicated by the arrowheads, enables hot gas to be taken from an area downstream of the high-pressure turbine, supplied to a first annulus 11, transported forward through the hot-gas line 6, introduced into a hot-gas chamber 15 and fed to a hot-gas annulus 16 through which the hot gas flows to the heat exchanger 5. This heat exchanger is of the counterflow-type and designed as a diffusor.

The cooled-down gas (cold gas) is returned via a cold-gas line 7 which, as illustrated in FIG. 4, is connected to a cold-gas chamber 17. A cold-gas chamber 17 is provided for each cold-gas line 7 and a hot-gas chamber 15 is provided for each hot-gas line.

Upstream of the cold-gas chamber 17, a cold-gas annulus 18 is arranged which collects the cooled-down gas from the heat exchanger 5.

The cold gas is returned through the cold-gas line 7 into the second annulus 12 (cf. FIGS. 1 and 2).

FIGS. 3 and 4 clarify the hot gas flows (FIG. 3) and the cold-gas flows (FIG. 4).

FIG. 5 is a simplified, schematic partial section of a first vane row 10 of the low-pressure turbine 4. The individual vanes are of the hollow type and feature one or several openings 8 in a leading-side area 9. As shown schematically in FIG. 5, the hot gas is ducted into the first annulus 11 via suitable lines or chambers.

FIG. 6 is a simplified, schematic sectional view of some vanes 13 in the inlet area of the low-pressure turbine 4. The vanes 13 are also of the hollow-type to enable cold air to be fed from the second annulus 12 into the vanes 13. As indicated by the arrowheads, the cold air is ducted through trailing-side openings or slots 14 which may be designed as nozzles.

It is apparent that a plurality of modifications other than those described may be made to the embodiment here shown without departing from the inventive concept.

Summarizing, then, the present invention relates to a turbojet powerplant with at least one compressor 1, at least one combustion chamber 2, a high-pressure turbine 3 and a low-pressure turbine 4, characterized in that a heat exchanger 5 is arranged between the compressor 1 and the combustion chamber 2, in that at least one hot-gas line 6 branches off from an area downstream of the high-pressure turbine 3 and is connected to the heat exchanger 5, and in that at least one cold-gas line 7 connects the heat exchanger 5 with an area upstream of the low-pressure turbine 4.

LIST OF REFERENCE NUMERALS 1 compressor
2 combustion chamber
3 high-pressure turbine
4 low-pressure turbine
5 heat exchanger
6 hot-gas line
7 cold-gas line
8 opening 9
9 edge area 10
10 first vane row
11 first annulus (hot)
12 second annulus (cold)
13 vane 3
14 opening
15 hot-gas chamber 5
16 hot-gas annulus 5
17 cold-gas chamber 5
18 cold-gas annulus 5
19 heat shield 11
20 heat shield 12

What is claimed is:

1. A turbojet power plant comprising:
   at least one compressor;
   at least one combustion chamber;
   a high-pressure turbine;
   a low-pressure turbine;
   a heat exchanger positioned between the compressor and the combustion chamber for heating air discharged from the compressor;
   at least one hot-gas line branching off from an area downstream of the high-pressure turbine and connected to the heat exchanger for conducting hot gas from the high-pressure turbine to the heat exchanger; and
   at least one cold-gas line connected to the heat exchanger for conducting cold gas from the heat exchanger to an area upstream of the low-pressure turbine, wherein hot-gas is conducted into the hot-gas line via openings in leading-side edge areas of a first vane row.

2. A turbojet power plant as in claim 1, wherein the heat exchanger can flow therethrough an entire amount of the air discharged from the compressor.

3. A turbojet power plant as in claim 1, wherein the heat exchanger is in the form of a diffuser.

4. A turbojet power plant as in claim 1, wherein the heat exchanger is of a counter-flow type.

5. A turbojet power plant as in claim 1, and further comprising an annulus connected to the cold-gas line for receiving the cold gas from the cold-gas line and conducting the cold gas to the low-pressure turbine.

6. A turbojet power plant comprising:
   at least one compressor;
   at least one combustion chamber;
   a high-pressure turbine;
   a low-pressure turbine;
   a heat exchanger positioned between the compressor and the combustion chamber for heating air discharged from the compressor;

at least one hot-gas line branching off from an area downstream of the high-pressure turbine and connected to the heat exchanger for conducting hot gas from the high-pressure turbine to the heat exchanger; and at least one cold-gas line connected to the heat exchanger for conducting cold gas from the heat exchanger to an area upstream of the low-pressure turbine, wherein the cold gas is conducted from the cold-gas line into vanes of the low-pressure turbine and through openings in trailing sides of the vanes.

7. A turbojet power plant as in claim 6, wherein the openings in the trailing sides of the vanes are in the form of nozzles.

8. A turbojet power plant comprising:

at least one compressor;

at least one combustion chamber;

a high-pressure turbine;

a low-pressure turbine;

a heat exchanger positioned between the compressor and the combustion chamber for heating air discharged from the compressor;

at least one hot-gas line branching off from an area downstream of the high-pressure turbine and connected to the heat exchanger for conducting hot gas from the high-pressure turbine to the heat exchanger; and at least one cold-gas line connected to the heat exchanger for conducting cold gas from the heat exchanger to an area upstream of the low-pressure turbine, wherein the heat exchanger comprises:

at least one local hot-gas chamber connected to the hot-gas line and a hot-gas annulus connected to the local hot-gas chamber; and at least one local cold-gas chamber connected to the cold-gas line and a cold-gas annulus connected to the local cold-gas chamber.

9. A turbojet power plant as in claim 1, and further comprising a first annulus connected to the hot-gas line for receiving the hot gas from the openings in the leading-side edge areas of the first vane row and conducting the hot gas to the hot-gas line.

10. A turbojet power plant as in claim 9, and further comprising a second annulus connected to the cold-gas line for receiving the cold gas from the cold-gas line and conducting the cold gas to the low-pressure turbine.

11. A turbojet power plant as in claim 10, wherein the cold gas is conducted from the second annulus into vanes of the low-pressure turbine and through openings in trailing sides of the vanes.

12. A turbojet power plant as in claim 11, wherein the openings in the trailing sides of the vanes are in the form of nozzles.

13. A turbojet power plant as in claim 12, wherein the heat exchanger comprises:

at least one local hot-gas chamber connected to the hot-gas line and a hot-gas annulus connected to the local hot-gas chamber; and at least one local cold-gas chamber connected to the cold-gas line and a cold-gas annulus connected to the local cold-gas chamber.

14. A turbojet power plant as in claim 13, wherein the heat exchanger is of a counter-flow type.

15. A turbojet power plant as in claim 14, wherein the heat exchanger can flow therethrough an entire amount of the air discharged from the compressor.

16. A turbojet power plant as in claim 15, wherein the heat exchanger is in the form of a diffuser.

* * * * *